Oct. 6, 1925. 1,555,811
J. S. ABERCROMBIE ET AL
FISHING TOOL FOR WELLS
Filed Jan. 13, 1923    2 Sheets-Sheet 1
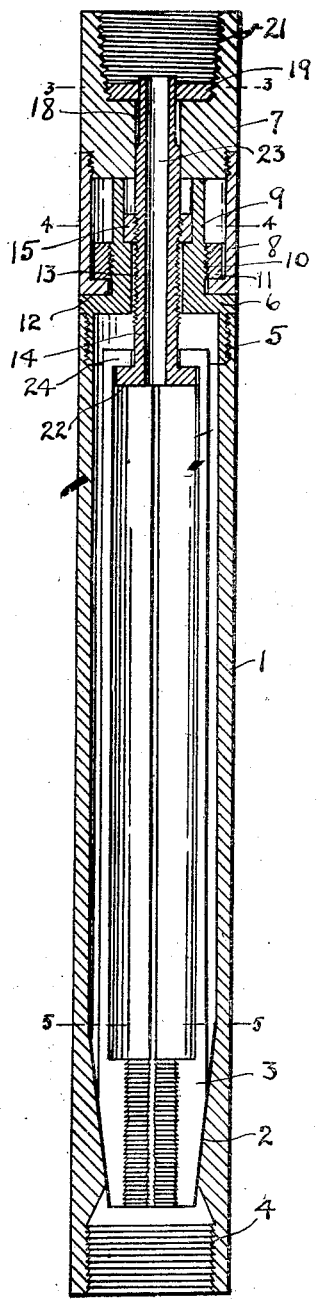
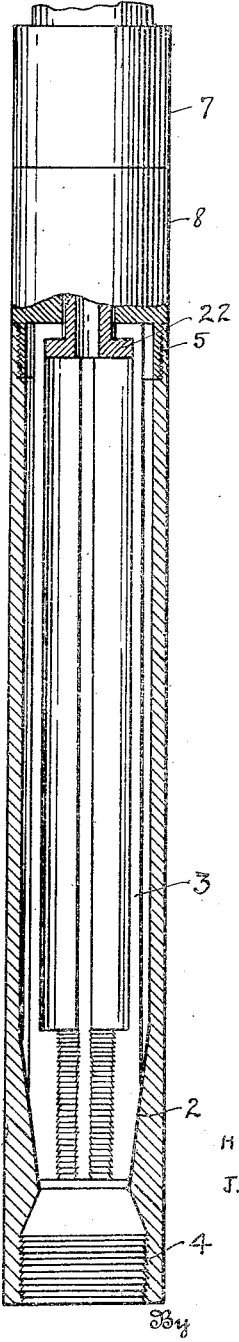
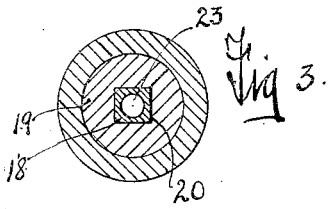
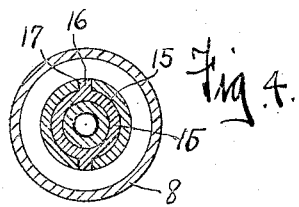
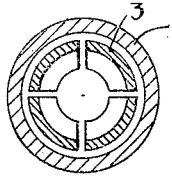
HARRY S. CAMERON AND
J. S. ABERCROMBIE, Inventors
By Jesse R. Stone
their Attorney

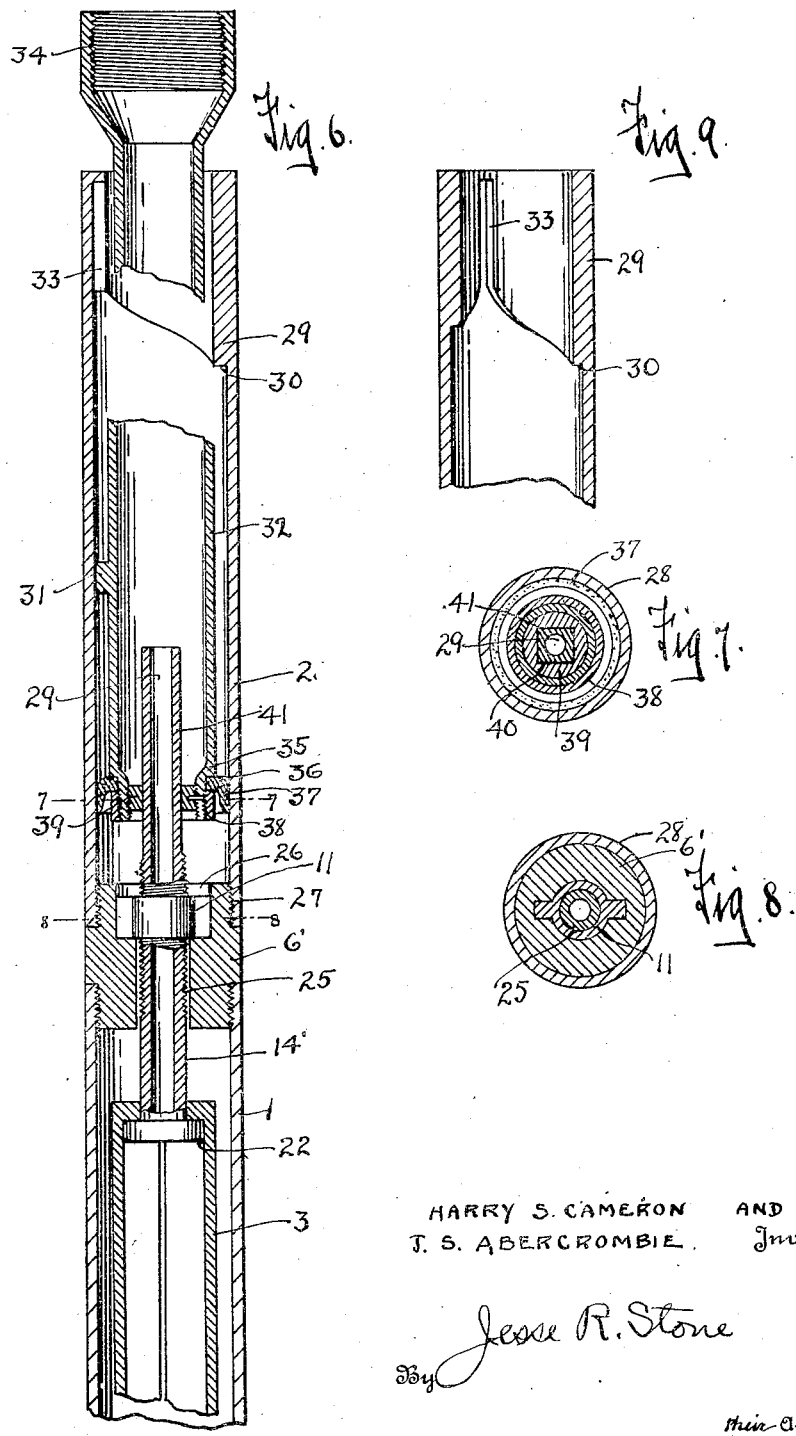

Patented Oct. 6, 1925.

1,555,811

UNITED STATES PATENT OFFICE.

JAMES S. ABERCROMBIE AND HARRY S. CAMERON, OF HOUSTON, TEXAS.

FISHING TOOL FOR WELLS.

Application filed January 13, 1923. Serial No. 612,495.

*To all whom it may concern:*

Be it known that we, JAMES S. ABERCROMBIE and HARRY S. CAMERON, citizens of the United States, residing at Houston, Harris County, Texas, have invented a certain new and useful Improvement in Fishing Tools for Wells, of which the following is a full, clear, and exact description, such as will enable others skilled in the art to which it appertains to make and use the same.

Our invention relates to fishing tools for use in removing broken pipe, tools and other "junk" from wells. It has particular reference to the slip-socket or overshot type of fishing tool which is adapted to go down over the pipe to be recovered and automatically grip the same.

The object of the invention is to construct a fishing tool adapted to grip the lost pipe and to again release the same when it is desired to do so.

Another object is to provide a fishing tool which is direct and positive in its action and not liable to get out of order and fail to function.

Another object is to provide such a fishing tool with means thereon to jar the pipe or other junk so as to loosen the same and thus assist in removing it from the well.

These and other objects and advantages of the invention will be more particularly set forth in the specification which follows. Referring to the drawings, Fig. 1 is a central longitudinal section through a tool embodying our invention; Fig. 2 is a similar view partly in elevation showing the jaws in different position; Figs. 3, 4 and 5 are transverse sections on the planes 3—3, 4—4, and 5—5 respectively, of Fig. 1; Fig. 6 is a broken longitudinal section illustrating a somewhat different embodiment of the invention; Figs. 7 and 8 are transverse sections on the planes 7—7 and 8—8 respectively of Fig. 6; Fig. 9 is a broken vertical section of the outer housing showing the registering means to bring the connecting pin into the proper slot. Like numerals of reference are applied to like parts in all the views.

The invention is disclosed in the drawings as applied to the slipsocket type of fishing tool. There is a lower barrel 1 having adjacent the lower end a thickened wall to provide a downwardly tapered seat 2 for the slips or jaws 3. Below this seat the walls of the barrel are beveled outwardly and the interior is toothed at 4.

The upper end of the barrel is recessed and threaded interiorly at 5 for attachment to the lower threaded end of the head 6. Said head is in turn connected rotatably with a collar 7 by a connecting sleeve 8. The swivel connection between said head and collar is accomplished by reducing the outer diameter of the head, thus providing a shank 9 threaded at 10 to receive a nut 11. The connecting sleeve 8 has an inwardly projecting lower flange 12 to be engaged below said nut and thus retain the head rotatably upon the collar.

The head 6 has a central channel 13 therethrough to slidably receive a pin 14. The upper end of said channel is recessed to provide space to receive a nut 15 having radial wings 16 fitting within slots 17 in the head. The nut is threaded upon the pin 14 but is slidable longitudinally in the recess 15.

The upward movement of the nut 15 is limited by the lower end of the collar 7. The said collar is also formed with a central channel therein to receive the upper end of the pin 14. The said pin is squared adjacent the upper end at 18, and said squared end is adapted to slide within a nut or plate 19, having a squared opening 20 therein to receive the pin. This plate is threaded on its outer periphery to fit within the lower end of the box 21 of the collar. Said collar is adapted to be attached in the usual manner to a drillstem or pipe by means of which the tool is operated in the well.

The lower end of the pin 14 has a head 22 therein over which the upper ends of the jaws 3 are adapted to be supported. The said pin is tubular in that it has a longitudinal channel 23 therethrough to allow the passage of flushing fluid when necessary in the operation of the tool. The jaws 3 may be of any desired length, and when in operative position the pin 14 is threaded downwardly in the nut 15 so as to provide room above the head 22 for the jaws to be moved upwardly out of the tapered seat 2. The said jaws may be of any desired number and, as shown in Fig. 5, we may use four such jaws, each of them having an inwardly extending flange 24 at the upper end to rest upon the head 22 of the pin.

In the operation of this tool it may be desired to lower the device into the well so as to telescope down over the upper end of a piece of pipe or drillstem in the well. The device is lowered until the upper end of the broken piece of pipe is received within the lower toothed portion 4 of the barrel. The said barrel will then be forced downwardly over the broken pipe. The pipe will strike against the lower ends of the jaws 3 and move them upwardly so that they will expand above the tapered seat, allowing the pipe to pass between the jaws upwardly into the barrel. When the device is then raised, the toothed faces of the jaws 3 contacting with the broken pipe will draw the jaws downwardly into the tapered seat 2, thus forcing them into tight gripping relation to the broken pipe. A further upward movement of the device will draw with it the said pipe. If, however, it is found that the pipe which has been gripped by the tool is anchored in the well in such manner that it can not be removed, or, if it is desired to obtain a different hold upon the pipe, the jaws may be released from their hold upon the pipe by lowering the device somewhat and rotating the drillstem and the coupling 7. By rotating said coupling the plate 19 will act to cause the rotation of the pin 14. This rotation of the pin in the usual right-hand direction will thread the pin outwardly through the nut 15 so as to catch the upper end of the jaws and force them in an upward direction out of the tapered seat 2, and thus allow them to expand so that the broken pipe may be released. The drillstem and collar 7 may be thus rotated without rotating the barrel 1 because of the swivel connection between the collar 8 and the nut 11. It is noted, however, that the particular shape of the nut 15 fitting within the recess in the said pipe will hold the nut stationary while the drill stem and collar are rotated.

When it is desired to grip the pipe again the pin may be screwed downwardly through the nut 15 thus releasing the jaws 3 and allowing them to drop back down into the tapered seat ready to grip the pipe again. It will thus be seen that the device may easily be adjusted to grip or release the "junk" which is to be removed.

In Figs. 6 to 9 inclusive I have shown a slightly different embodiment of releasing means for the jaws of the slip socket. In this modification the barrel 1 is secured at its upper end to a head 6' which has a central channel 25 through which a pin 14' is adapted to fit loosely. The said pin is threaded midway of the ends to accommodate a winged nut 11 fitting within a slot or recess 26 in the head. This nut is of the same construction as is the nut previously described, and is held non-rotatable or slidable in contact with the head 6'.

At the upper end of the head the diameter is slightly reduced and threaded at 27 for attachment to a housing 28. Said housing comprises a length of pipe, the walls of which are of ordinary thickness except adjacent the upper end where they are thickened as shown at 29, to provide a lower inclined shoulder 30 to direct the lateral pin 31 upon the inner pipe 32 into the upwardly extending slot or channel 33 formed in the thickened wall 29 as shown best in Fig. 9.

Within the housing 28 the pipe 32, previously referred to, is adapted to fit somewhat loosely so that it may rotate and move longitudinally therein. The pipe 32 has a swedged coupling 34 at the upper end for attachment to a drillstem or other operating pipe not shown. The lower end of the said pipe 32 is reduced in diameter at 35 to provide a shoulder 36 against which a flexible cup 37 may be clamped by means of a nut or sleeve 38. Within the reduced lower end of the pipe is attached a disk or diaphragm 39 having a squared opening 40 therein to receive the squared upper end 41 of the pin 14'. The pin 14' is tubular having a channel 29 therethrough to allow the passage of liquid.

The operation of this device is very similar to the one previously described. The gripping jaws may be raised or lowered within the tapered seat by rotating the pipe 32 within the housing 28. In order to thus rotate the said pipe relative to the housing the inner pipe must be moved downwardly so that the lateral pin 31 thereon will move within the larger diameter of the housing. The pin 14' may thus be raised or lowered to adjust the position of the clamping jaws as desired. When it is found that the broken pipe or other "junk" can not be moved, the said pipe may be jarred to loosen the same by dropping the pipe 32 abruptly within the housing so that the enlarged upper end 34 will strike the upper end of the housing. When it is desired to rotate the complete tool, the same may be accomplished by raising the pipe 32 within the housing, bringing the radial pin 31 against the shoulder 30, which will direct the pin around into the slot 33, thus causing the housing and the rest of the tool to rotate with the drill stem. The particular advantage of this arrangement lies in the fact that the telescoping device affords opportunity for jarring the pipe which is gripped, thus often enabling the operator to loosen and remove parts which could not otherwise be handled.

If the junk or pipe catches while the same is being removed from the hole, the rotation of the device will serve to loosen it and thus overcome this difficulty.

During the operation of this tool it is frequently necessary to wash down in front of the tool as it goes into the well, and this may be accomplished by pumping fluid downwardly through the drill stem and through the channel 29, through the pin 14'. The flexible cup 37 prevents the fluid being thus pumped from finding an exit upwardly between the housing and the pipe 32.

The advantages of this type of release spear or slip socket will be obvious to those skilled in the art without further description. What we claim is new and desire to protect by Letters Patent is:

1. In a fishing tool for wells, a head, a barrel thereon having a downwardly tapered seat at the lower end, gripping jaws tapered to fit said seat and adapted to move vertically therein, a pin connected with said jaws and slidable vertically in said head, a nut screwed on said pin and having a slidable but non-rotatable fit in said head and means to rotate said pin comprising a collar above said head and rotatably connected therewith.

2. In a fishing tool for wells, a head, a barrel thereon having a downwardly tapered seat at the lower end, gripping jaws tapered to fit said seat and adapted to move vertically therein, a pin connected with said jaws and slidable vertically through said head, a nut on said pin fitting non-rotatably in said head and means above said head to rotate said pin and raise or lower said jaws.

3. In a fishing tool for wells, a head, a barrel thereon having a downwardly tapered seat at the lower end, gripping jaws in said barrel, tapered to fit in said seat, a pin connected with said jaws and slidable vertically in said head, a collar above said head having a rotatable connection therewith, means in said collar to rotate said pin and means on said pin fitting in said head to move said pin vertically when it is rotated.

4. In a fishing tool for wells, a head, a fishing tool connected therewith, comprising gripping jaws, a pin rotatably connected with said jaws and slidable vertically through said head, a nut on said pin, means separate from said nut and in which said nut is slidable to rotate said pin in said nut and to thus move said pin vertically in said head and raise or lower said jaws.

5. In a fishing tool, a head, a barrel below said head having a tapered seat therein, pipe-gripping jaws in said seat, a pin slidable vertically in said head and having supporting engagement with said jaws, means to rotate said pin while said tool is in the well, said means adapted to strike a blow on said tool when desired to loosen the work operated upon.

6. In a fishing tool, a head, a barrel below said head having a tapered seat therein, gripping jaws adapted to fit said seat, a pin in said head and slidable longitudinally therein, a nut on said pin slidable but non-rotatable in said head, means above said head to rotate said pin, said rotating means being adapted to strike a blow on said tool for the purpose described.

In testimony whereof, we hereunto affix our signatures this 8th day of January, A. D. 1923.

JAMES S. ABERCROMBIE.
HARRY S. CAMERON.